W. A. COZART.
MAIZE, KAFIR CORN, AND CANE HEADING MACHINE.
APPLICATION FILED SEPT. 26, 1911.
1,065,296.
Patented June 17, 1913.
3 SHEETS—SHEET 2.
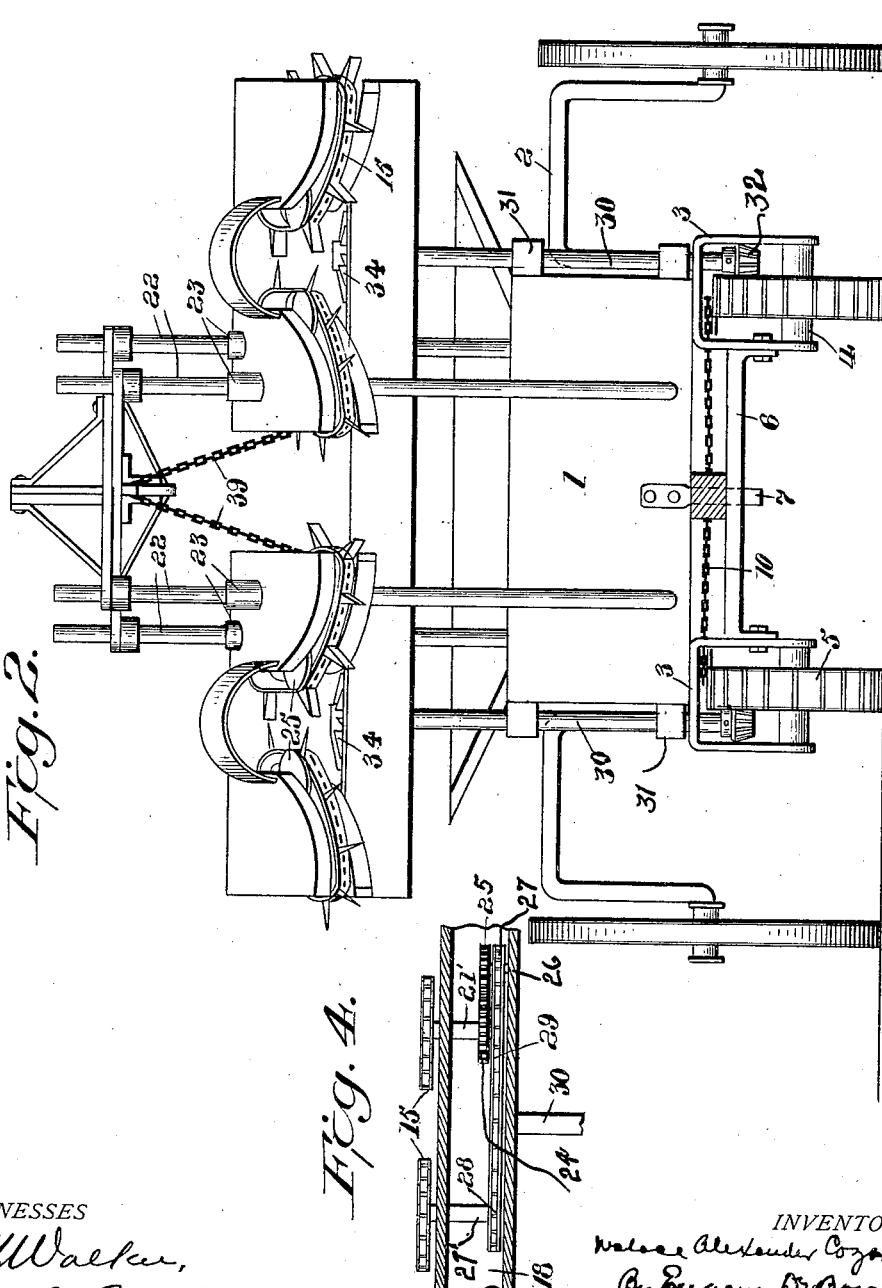

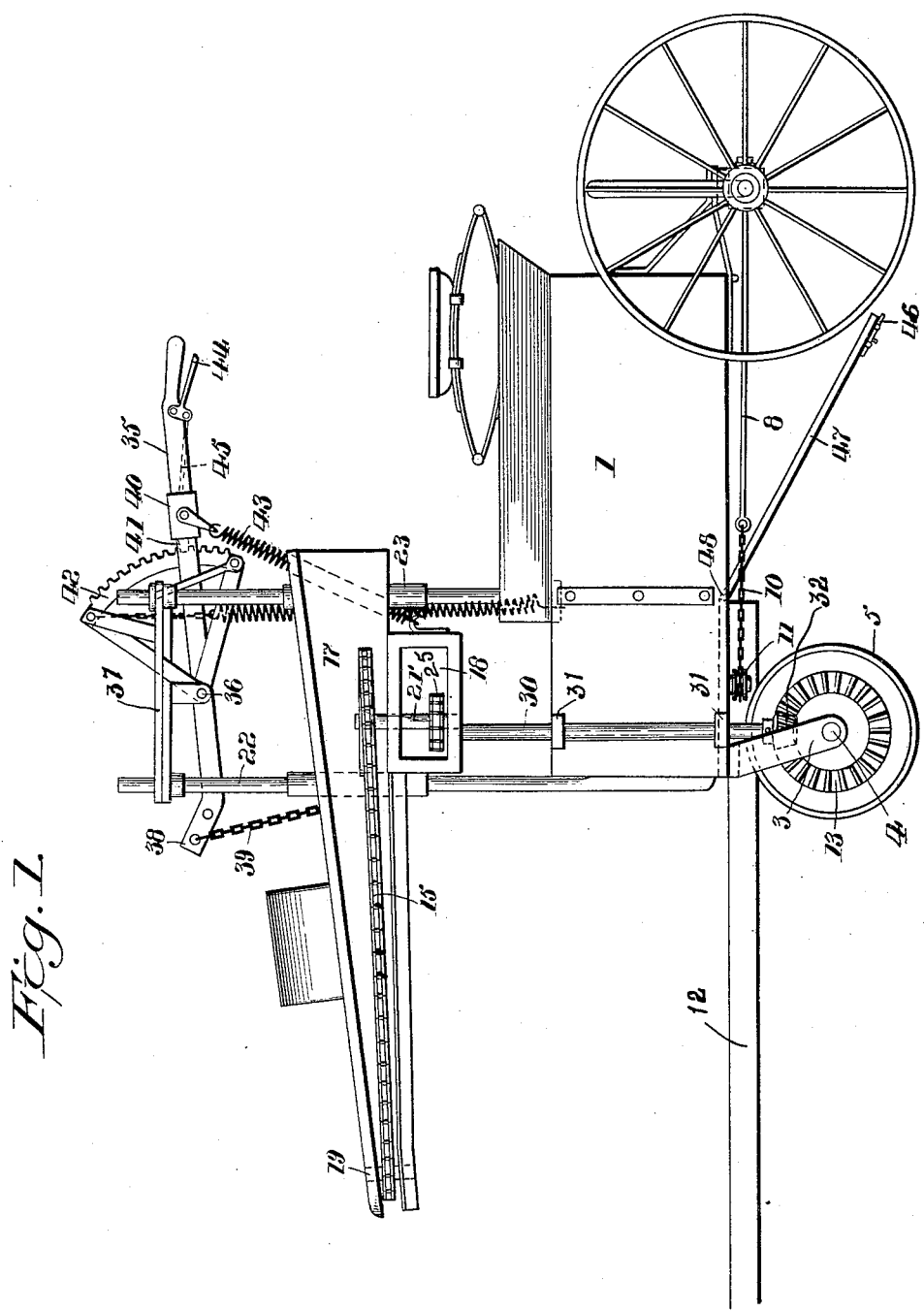

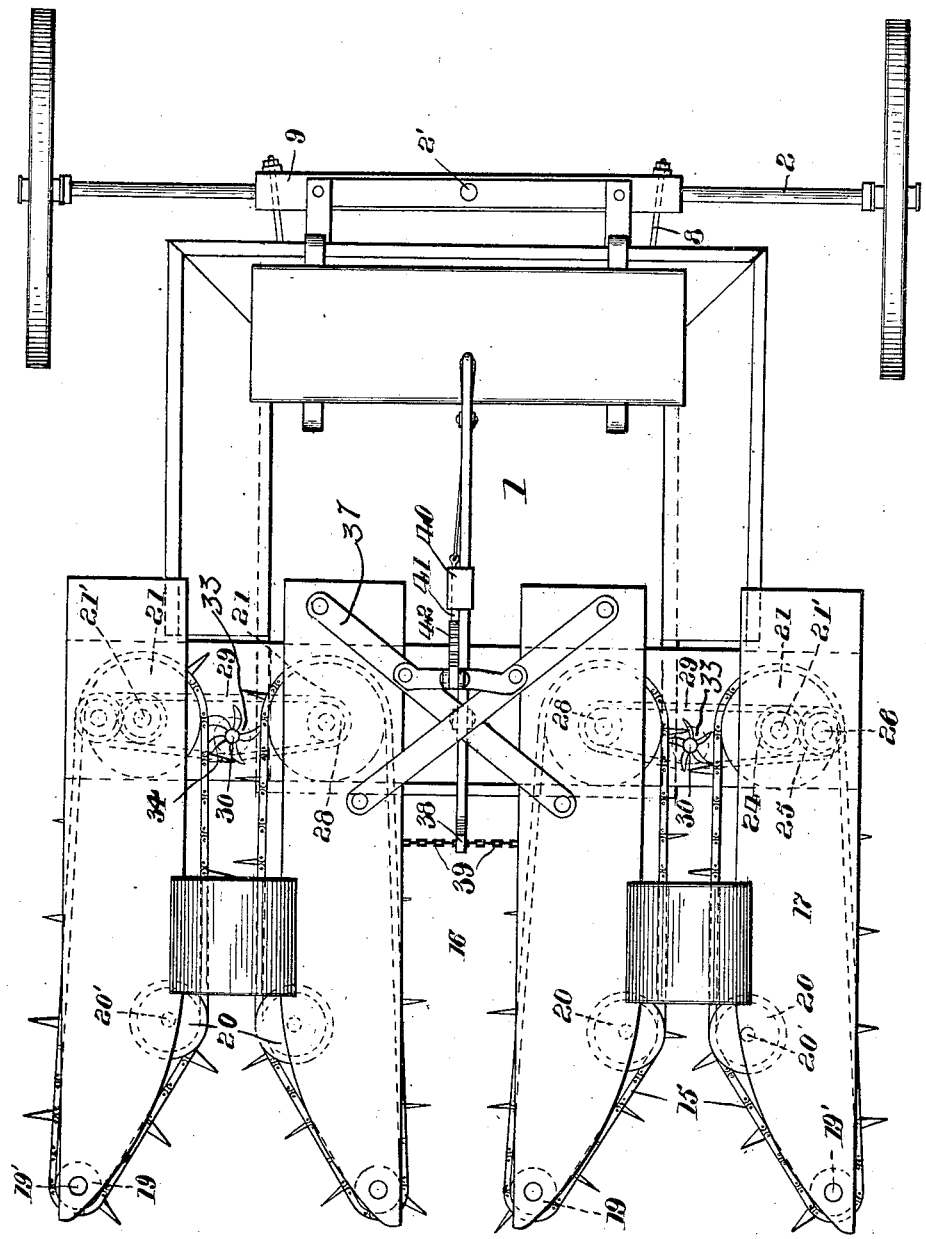

UNITED STATES PATENT OFFICE.

WALACE ALEXANDER COZART, OF CAPS, TEXAS.

MAIZE, KAFIR-CORN, AND CANE HEADING MACHINE.

1,065,296.	Specification of Letters Patent.	Patented June 17, 1913.

Application filed September 26, 1911. Serial No. 651,427.

*To all whom it may concern:*

Be it known that I, WALACE ALEXANDER COZART, a citizen of the United States, residing at Caps, in the county of Taylor and State of Texas, have invented certain new and useful Improvements in Maize, Kafir-Corn, and Cane Heading Machines, of which the following is a specification.

My invention relates to maize, Kafir corn and cane heading machines, and has for its object to improve the general construction of this class of machines, whereby a single machine will harvest two rows at the same time.

A further object is to reduce the labor of the operator to such an extent that the services of one person will be sufficient for performing the work generally requiring two or more helpers.

With these and other objects in view which will be apparent as the description proceeds the invention consists of certain novel features of construction and combination of parts shown in the accompanying drawings, in which—

Figure 1 is a side elevation of a machine constructed in accordance with this invention. Fig. 2 is a front view of the machine. Fig. 3 is a top plan view. Fig. 4 is a detail view of belt driving mechanism.

Referring more specifically to the drawings in which like reference numerals designate corresponding parts in all the views 1 represents the box or body of the machine pivotally supported at its rear end upon the arched rear axle 2 as at 2′ and at its front end upon yokes 3 which yokes also serve as bearings for the stub axles 4 of the front wheels 5. A brace 6 connects the inner arms of the yokes 3 together and a pin 7 secured to the front wall of the box 1 passes through the brace thus securing these parts against relative movement.

The machine is guided by means of rods 8 connected at one end to the bar 9 fixed on rear axle 2 and at the other end to chains 10 passing over guide pulleys 11 and secured to the rear end of the tongue 12. It will be seen from an inspection of Fig. 2 that the tongue 12 is pivoted upon the pin 7 which serves as a fulcrum for turning the rear wheels when the axle is rocked in either direction. As a matter of convenience the usual arched breast yoke and double tree are omitted but it will be understood that the illustration of these parts is immaterial.

The stalk feeding and guiding mechanism comprises two pairs of endless belts 15, one pair on each side of the central opening 16. These belts are mounted in forwardly projecting protective casings 17 also arranged in pairs at each side of the machine and secured together adjacent their rear ends by being attached in any suitable manner (not shown) to a laterally extending housing 18 arranged slightly above the forward end of the box or body portion 1. The casings 17 and housing 18 are slidably mounted upon posts 22 secured to the body portion and which project upwardly through sleeves 23 carried by the two innermost casings 17. Each endless belt or chain 15 runs over pulleys 19, 20 and 21 fixedly mounted on short shafts 19′, 20′ and 21′ respectively. The lower ends of the outermost shafts 21′ which depend into the boxing 18 carry gears 24 meshing with gears 25 on short shafts 26 mounted in each end of the boxing 18. These short shafts 26 also carry sprocket wheels 27 which are connected with small sprocket wheels 28 on the innermost shaft 21′ of each pair by short transversely traveling endless chains 29.

Vertical driving shafts 30 arranged in bearings 31 at each side of the forward end of the machine have bevel gears 32 at their lower end in mesh with gear teeth 13 on the side of front wheels 5, and sprocket wheels 33 adapted to engage the transverse chains 29. It will thus be seen that as the machine is propelled over the ground the shafts 30 will be rotated causing the chain 29, innermost short shafts 21′, shafts 26 and the innermost chains of each pair to rotate in the same direction. The outermost short shafts 21′ of each pair are caused to rotate in the opposite direction to the innermost shafts 21′ by reason of their being geared to shafts 26. Therefore it will be noted that the chains 15 of each pair rotate in a proper direction to guide the stalks of grain to rotary cutters 34 on the upper ends of driving shafts 30.

When it is desired to move the stalk feeding and cutting mechanism to inoperative position the casing 17 and housing 18 together with the mechanism mounted therein is bodily raised upon posts 22 until the transverse chains 29 become disengaged from shafts 30. This is accomplished by means of a lever 35 fulcrumed at 36 to cross arms 37 supported upon collars carried by the posts 22. The bent end 38 of this lever 35 is connected to a chain 39 in turn attached to the casings 17. A collar 40 slidably mounted upon the lever 35 has a dog 41 adapted to be held in engagement with the rack segment 42 by spring 43 except when released by the operator gripping hand lever 44 connected to collar 40 by link 45.

As the stalks are cut, one row being fed to a cutter 34 by each pair of toothed belts 15, the grain drops into the box 1 where it accumulates until the latch device 46 is released whereupon the bottom 47 of box 1 swings down upon its hinges 48 thus dumping its load.

Having thus described my invention, what I claim is:

In a cane heading machine, a body portion, vertical posts on said body portion, traction wheels having gear teeth thereon, a pair of feed belts at each side of the machine, casings for said belts having sleeves mounted upon said posts, a laterally extending boxing connecting said casings together and movable therewith, short shafts connected at their upper ends to said feed belts and having their lower ends extending into said boxing, sprockets on the lower end of the inner short shaft of each pair, additional short shafts in said boxing having sprockets on their lower ends, transverse belts connecting the sprockets of said additional short shafts with the sprocket on the innermost first mentioned short shaft of each pair, gears connecting said additional short shafts respectively with the outermost first mentioned short shaft of each pair, vertical shafts carrying cutters, said vertical shafts having beveled gears on one end in mesh with the teeth on said traction wheels and sprockets normally engaging said transversely extending belts, and means for raising and lowering said casings with the mechanism therein contained.

In testimony whereof I affix my signature in presence of two witnesses.

WALACE ALEXANDER COZART.

Witnesses:
 FELIX R. JONES,
 GEO. C. BISHOP.